A. W. AUBREY.
NUT LOCK.
APPLICATION FILED JULY 20, 1914.
1,121,156.
Patented Dec. 15, 1914.
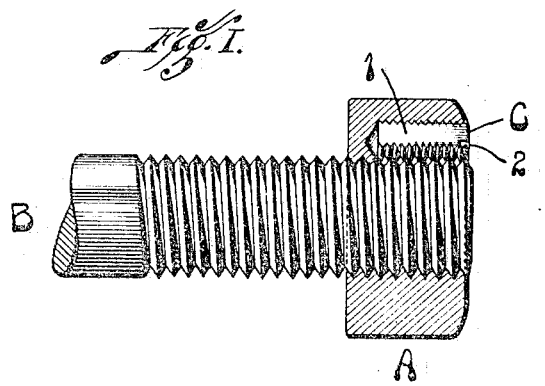
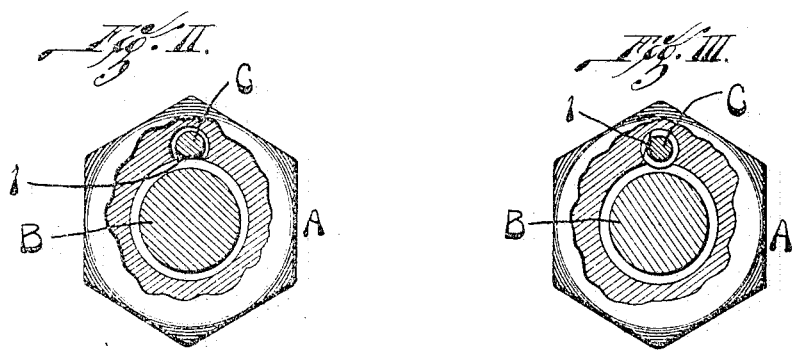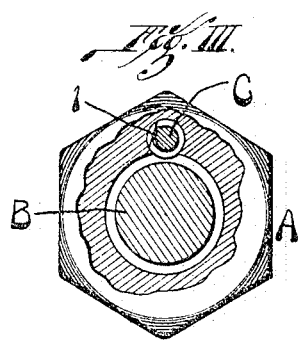
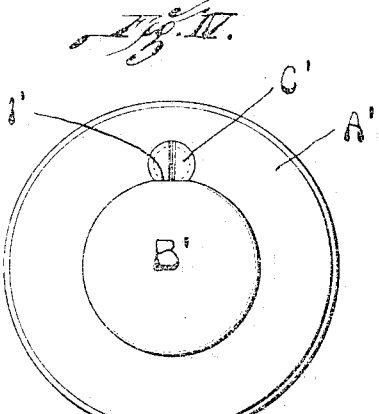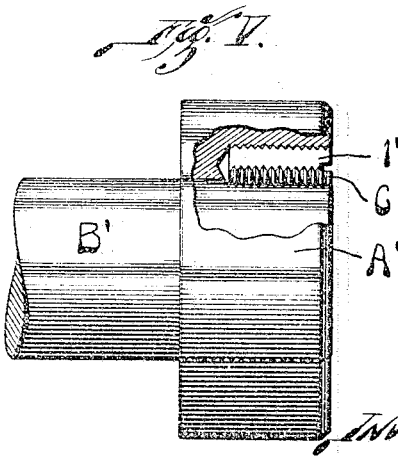
Inventor
A. W. Aubrey

UNITED STATES PATENT OFFICE.

ANDREW W. AUBREY, OF ST. LOUIS, MISSOURI.

NUT-LOCK.

1,121,156.  Specification of Letters Patent.  Patented Dec. 15, 1914.

Application filed July 20, 1914. Serial No. 851,892.

*To all whom it may concern:*

Be it known that I, ANDREW W. AUBREY, a citizen of the United States of America, and a resident of the city of St. Louis, State of Missouri, have invented a certain new and useful Improvement in Nut-Locks, of which the following is a full, clear, and exact description, reference being had to the accompanying drawings, forming a part of this specification.

My invention relates to improvements in nut locks, one of the objects being to provide a simple and inexpensive locking device for securing a nut to a bolt or other threaded member. The locking device is also adapted to be used in locking a set collar to a shaft.

Another object of the invention is to produce a nut lock adapted to lock a nut to the threads of an ordinary bolt, the locking device being preferably a screw, screwed into a nut and adapted to interlock with the threads of the bolt to which the nut is applied.

Figure I is a side elevation, partly in section, showing a bolt, a nut, and the locking device for securing the nut to the bolt. Fig. II is an end elevation partly in section, showing the locking device in the position it occupies while the nut is being screwed onto the bolt. Fig. III is a view similar to Fig. II showing the nut locked onto the bolt. Fig. IV is an end elevation showing the locking device applied to a set collar. Fig. V is a side elevation, partly in section, of the parts shown in Fig. IV.

A designates a nut screwed onto the threaded end of a bolt B, the nut being provided with a screw threaded bolt receiving opening and also with a screw threaded opening for the reception of a locking screw C. The screw threaded openings in the nut are preferably formed substantially parallel with each other, and the bolt receiving opening is in communication with the other screw threaded opening. The locking screw C is provided with a substantially flat face 1 adapted to lie directly opposite the bolt as shown in Fig. II.

Before applying the nut to a bolt, the locking screw C is screwed into the nut by means of a screw driver or other suitable means, the locking screw I have shown being provided with a notch 2 for the reception of a screw driver. While the nut is being screwed onto the bolt the locking screw occupies the position seen in Fig. II, and just before the rotary movement of the nut is completed the locking screw is turned slightly by means of a screw driver to engage the sharp corners of the locking screw threads with the threads of the bolt, and the rotary movement of the nut is then completed with the result of turning the locking screw in the nut, thereby forcing the threads of the locking screw into, or onto, the threads of the bolt to securely lock the nut. When the nut is locked onto the bolt the locking screw C occupies the position shown in Fig. III wherein the threads of the locking screw overlap the threads of the bolt. The bolt I have shown is provided with a right hand screw thread while the locking screw is provided with a left hand screw thread; and since the threads of the locking screw will in some cases be forced into the threads of the bolt to produce indentations in the latter, the locking screw is preferably case-hardened.

In removing the nut from the bolt, the nut is turned slightly, by means of a wrench, to release the locking screw C, and the latter may then be turned by a screw driver to locate its flat face 1 directly opposite the threads of the bolt, as shown in Fig. II. This releases the nut and it may be readily unscrewed from the bolt.

It will be noted that my nut lock is adapted for use with the ordinary standard bolt, the locking screw being seated in the threaded opening in the nut where it will serve as means for securing the nut to the bolt threads.

In Fig. IV and Fig. V, I have shown the locking screw C' applied to a set collar A', and a shaft B'. The set collar is a rotatable member corresponding to the nut A, and it is provided with a threaded opening communicating with the shaft receiving opening in the set collar. The locking screw C' is formed with a flat face 1' adapted to lie directly opposite a flat face of the shaft as shown in Fig. IV.' When the set collar is adjusted to the desired position on the shaft B', the locking screw is turned slightly to force its sharp corners into engagement with the flat face of the shaft, and the set collar is then turned to impart a rotary movement to the locking screw, thereby turning the locking screw to the position shown in Fig. V wherein its screw threads are embedded in the shaft. The set collar is thus very firmly secured to the shaft. In removing the set collar it is turned by means of a suitable wrench to locate the locking screw directly opposite the flat face of the shaft, and the locking screw may then be adjusted, if necessary, by means of a screw driver, to the position shown in Fig. IV thereby unlocking the set collar from the shaft.

I claim:

1. In a device of the character described, a bolt having a screw threaded end, a nut fitted to said bolt, said nut being provided with a screw threaded bolt receiving opening and with a screw threaded opening for the reception of a locking screw, said screw threaded openings being substantially parallel with each other and the bolt receiving opening being in communication with the other screw threaded opening, and a locking screw screwed into the nut, said locking screw being provided with screw threads adapted to overlap the screw threads of said bolt, and said locking screw being provided with a flat face adapted to lie directly opposed to the threads of said bolt.

2. In a device of the character described, a bolt having a screw threaded end, a nut fitted to said bolt, said nut being provided with a screw threaded bolt receiving opening and with an opening for the reception of a locking screw, said openings being substantially parallel with each other and the screw threaded bolt receiving opening being in communication with the other opening, and a locking screw seated in the last mentioned opening, said locking screw being provided with mutilated screw threads extending partially around its periphery and adapted to overlap and bear against the screw threads of said bolt to prevent the nut from turning on said bolt, the face of said locking screw between the ends of its mutilated threads being closer to the axis of said locking screw than the outer points of said mutilated threads so that the locking screw may be adjusted in the nut to permit the nut to turn freely on the bolt.

3. In a device of the character described, a bolt having a screw threaded end, a nut fitted to said bolt, said nut being provided with a screw threaded bolt receiving opening and with a screw threaded opening for the reception of a locking screw, said screw threaded openings being substantially parallel with each other and the bolt receiving opening being in communication with the other screw threaded opening, and a locking screw screwed into the nut, said locking screw being provided with mutilated screw threads extending partially around its periphery and adapted to overlap and bear against the screw threads of said bolt to prevent the nut from turning on said bolt, the face of said locking screw between the ends of its mutilated threads being closer to the axis of said locking screw than the outer points of said mutilated threads so that the locking screw may be adjusted in the nut to permit the nut to turn freely on the bolt.

4. A device of the character described comprising a rotatable outer member having an opening and also having a screw threaded opening communicating with and substantially parallel with the first mentioned opening, a substantially circular inner member in said opening of the rotatable outer member, and a locking screw screwed into said screw threaded opening, said locking screw being provided with mutilated screw threads extending partially around its outer face and adapted to be forced into said substantially circular inner member to prevent the rotatable outer member from turning on said substantially circular inner member, the face of said locking screw between the ends of its mutilated threads being closer to the axis of said locking screw than the outer points of said mutilated threads so that the locking screw may be adjusted in said rotatable outer member to permit the latter to turn freely on the substantially circular inner member.

ANDREW W. AUBREY.

In the presence of—
M. M. APGAR,
A. J. McCAULEY